United States Patent [19]

Yamamoto et al.

[11] Patent Number: 4,498,259
[45] Date of Patent: Feb. 12, 1985

[54] NUMERICAL CONTROLLER FOR A GRINDING MACHINE

[75] Inventors: Katsumi Yamamoto, Takahama; Yuichiro Komatsu; Ikuro Hamada, both of Kariya, all of Japan

[73] Assignee: Toyoda Koki Kabushiki Kaisha, Kariya, Japan

[21] Appl. No.: 503,589

[22] Filed: Jun. 13, 1983

[30] Foreign Application Priority Data

Jun. 23, 1982 [JP] Japan ................... 57-107772

[51] Int. Cl.³ ............................... B24B 49/02
[52] U.S. Cl. .................. 51/165.71; 51/105 SP; 51/165.88; 364/474
[58] Field of Search ......... 51/165 R, 165.71, 165 TP, 51/165.77, 165.87, 165.88, 105 SP; 364/474

[56] References Cited

U.S. PATENT DOCUMENTS

| 3,746,956 | 7/1973 | Takeqawa | 51/165 TP |
| 4,061,952 | 12/1977 | Dinsdale | 51/165.87 |
| 4,292,766 | 10/1981 | Kirk | 51/105 SP |
| 4,328,448 | 5/1982 | Berenberg | 364/474 |

Primary Examiner—Harold D. Whitehead
Attorney, Agent, or Firm—Oblon, Fisher, Spivak, McClelland & Maier

[57] ABSTRACT

In a computerized numerical controller for a grinding machine, various grinding modes in which a plurality of portions on a cylindrical workpiece are respectively ground and plural sets of machining data each for use in machining a corresponding one of the workpiece portions are input by a manual data input device for storage in a memory device under the control of a data processor. For preparation of an NC program for the workpiece, the data processor first decides a grinding order in which the workpiece portions are successively ground, based upon the grinding modes and the machining data stored in the memory device. The grinding order is decided in accordance with a predetermined rule designed to decrease the number of dressing operations effected on a grinding wheel of the grinding machine. Then, the data processor automatically prepares a NC program based upon the decided grinding order and the machining data. In an NC operation, the data processor controls a pulse generating circuit in accordance with the NC program. Therefore, first and second feed devices responsive to feed pulses from the pulse generating circuit effect relative movement between a grinding wheel head and a workpiece support table in accordance with the NC program, whereby the workpiece portions can be successively ground in the automatically decided grinding order.

8 Claims, 10 Drawing Figures

| GRINDING MODE | |
| TABLE INDEXING POSITION | |
| RAPID FEED AMOUNT | |
| RAPID FEED RATE | |
| ROUGH GRINDING INFEED AMOUNT | |
| ROUGH GRINDING INFEED RATE | |
| FINE GRINDING INFEED AMOUNT | |
| FINE GRINDING INFEED RATE | STB 1 |
| FINISH GRINDING INFEED AMOUNT | |
| FINISH GRINDING INFEED RATE | |
| TRAVERSE STROKE | |
| TRAVERSE FEED RATE | |
| NUMBER OF TRAVERSES | |
| ⋮ | |
| GRINDING MODE | |
| TABLE INDEXING POSITION | STB 2 |

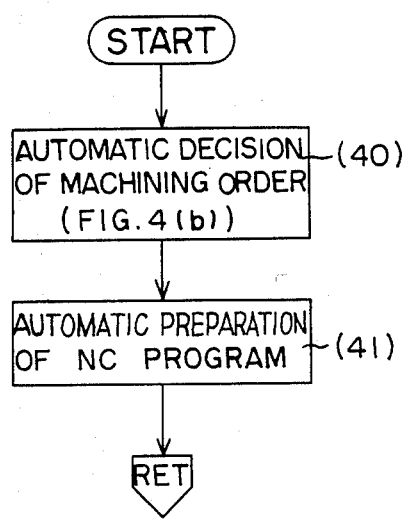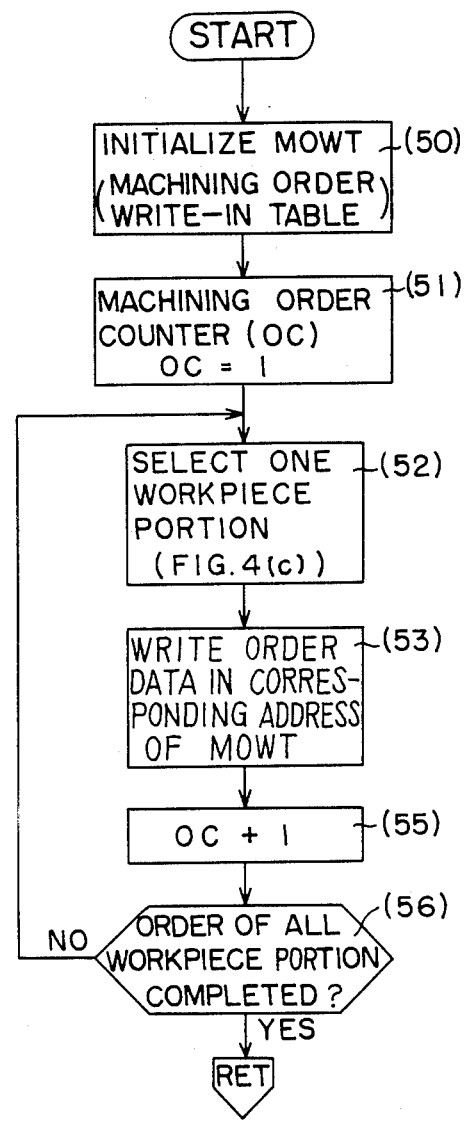

NUMERICAL CONTROLLER FOR A GRINDING MACHINE

BACKGROUND OF THE INVENTION

1. Field of the Invention

The present invention relates to a numerical controller for controlling a grinding machine in accordance with a numerical control program to grind successively a plurality of cylindrical portions formed on a rotating workpiece.

2. Description of the Prior Art

In a numerically controlled grinding machine of the type mentioned above, a grinding wheel must be dressed to refresh its damaged or roughened grinding surface each time of grinding a plurality of portions on a workpiece. The time when such dressing becomes due varies depending largely upon the order in which the workpiece portions are ground. Frequent wheel dressings may therefore be required in the course of successive grindings of the workpiece portions unless the same are ground in an appropriate order which is determined by a particular rule of practice.

Accordingly, in order to eliminate wheel dressings or decrease the number of wheel dressings in the course of successive grindings of a plurality of portions on a workpiece, the workpiece portions must be ground in order from one needing a higher finish accuracy to another needing a lower finish accuracy. In fact, in the case of a workpiece having a plurality of portions to be ground, it has been a general rule of practice that one of the workpiece portions with the highest required accuracy is ground under a direct sizing control by a sizing device prior to grinding the remaining workpiece portions under an indirect sizing control. Further, regarding the workpiece portions not needing the direct sizing control during grinding operation, any traverse grinding operation has to have preference to any plunge grinding operation wherein a workpiece portion with a wider axial width than that of a grinding wheel is ground, because unlike the traverse grinding operation, the plunge grinding operation creates a stepped local wear on the grinding surface of the grinding wheel.

That is, for the purpose of eliminating dressing operations or decreasing the number of dressing operations in the course of a series of grinding operations on a workpiece, a plurality of portions on the workpiece must be ground in such a particular order as explained above. However, the numerically controlled grinding machines known heretofore are not provided with a capability to decide automatically such a grinding order, and thus various data preparation procedures are imposed on the operator, such as deciding a grinding order taking into consideration the kinds of grindings on respective portions of a workpiece, the axial widths of the workpiece portions and so forth, and inputting data indicative of the decided grinding order. Accordingly, in operation of the known numerically controlled grinding machine, it is laborious for the operator to input machining data. In addition, if the machining data is input by an operator who does not know the procedural steps of deciding such a grinding order, it may happen that the grinding order decided by the operator is not in accordance with the above-noted particular rule of practice. This results in a failure in attaining the required finish accuracies or in the undesirable execution of an additional dressing operation in the course of a series of grinding operations in order to avoid such failure, thus leading not only to ineffective use of the grinding wheel, but also to a long total grinding cycle time.

SUMMARY OF THE INVENTION

It is therefore a primary object of the present invention to provide an improved numerical controller for a grinding machine capable of automatically deciding a grinding order for a plurality of portions of a workpiece based upon machining data which are input by an operator for grinding the workpiece portions to respective required finish dimensions and accuracies.

Another object of the present invention is to provide an improved numerical controller of the character set forth above wherein the automatic decision of the grinding order is executed in such a manner as to eliminate dressing operations or decrease the number of dressing operations in the course of a series of grinding operations on the workpiece portions, thereby realizing effective use of a grinding wheel as well as reduction of the total grinding cycle time.

A further object of the present invention is to provide an improved numerical controller for a grinding machine of the character set forth above wherein a data processor is utilized to decide automatically such a grinding order based upon the machining data, to prepare automatically a numerical control program based upon the decided grinding order and the machining data, and to control the grinding machine in accordance the numerical control program.

Briefly, according to the present invention, these and other objects are achieved by providing a numerical controller for a grinding machine, including a data input device, a memory device, a grinding order decision circuit device and a feed control circuit device. The data input device enables an operator to input various grinding modes in which a plurality of portions on a workpiece are to be ground and to input plural sets of machining data respectively used for grinding the workpiece portions. The input grinding mode data and machining data are stored in the memory device. The grinding order decision circuit device decides a grinding order in which the workpiece portions are successively ground, based upon the grinding mode data and the machining data being stored in the memory device. The decision of such a grinding order is made in accordance with a predetermined rule. Preferably, this rule is provided for decreasing the number of dressing operations effected on a grinding wheel of the grinding machine.

The numerical control circuit device operates based upon the decided grinding order data and the machining data and controls first and second feed devices for effecting relative movement between a grinding wheel support and a workpiece support of the grinding machine so as to grind successively the workpiece portions in the decided grinding order and based upon the plural sets of machining data.

In a preferred configuration, the numerical control circuit device includes an automatic programming circuit device and a feed control device. The automatic programming circuit device automatically prepares a numerical control program which enables the workpiece portions to be ground successively to respective dimensions designated by the plural sets of machining data in the decided grinding order. The feed control circuit device controls the first and second feed devices in accordance with the numerical control program.

According to a principal aspect of the present invention, the order in which a plurality of workpiece portions are successively ground is automatically decided, which results in successfully reducing the kinds and number of machining data which have to be input by the operator by means of the data input device. According to another aspect of the present invention, effective use of the grinding wheel and reducing of the total cycle time which is taken to grind successively the workpiece portions can be accomplished because the grinding order is decided in accordance with a particular rule which is provided for eliminating dressing operations or decreasing the number of dressing operations in the course of a series of grinding operations on the workpiece portions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4(a) is a general flow chart of a system control program executed by a data processor shown in FIG. 1 for automatic decision of a grinding order and automatic preparation of a numerical control program;

FIG. 4(b) is a specific flow chart of a grinding order deciding routine executed by the data processor;

DETAILED DESCRIPTION OF A PREFERRED EMBODIMENT

Figure 1:
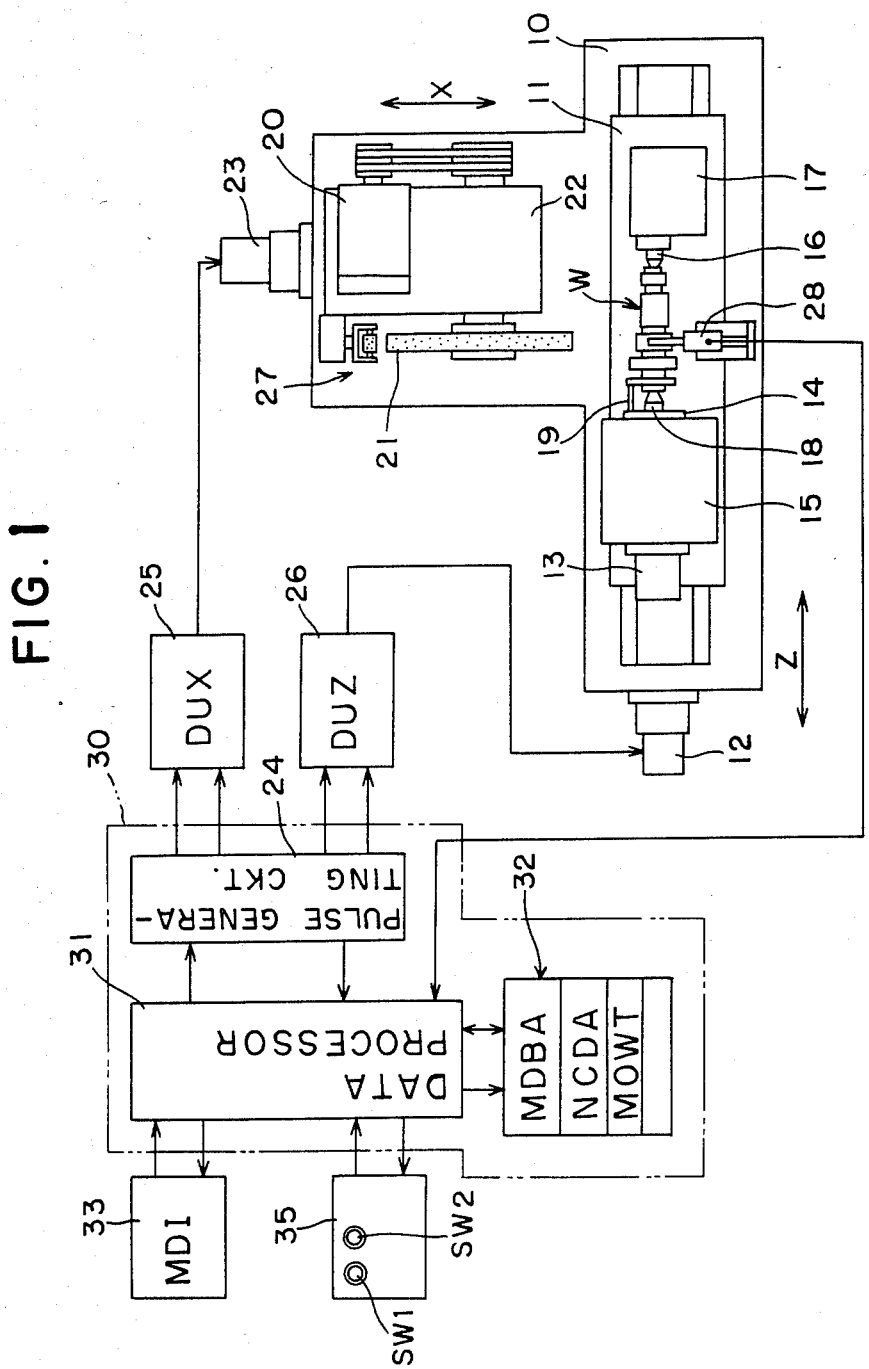
FIG. 1 is a schematic plan view of a grinding machine, also showing a numerical controller therefor according to the present invention.
Figure 2:
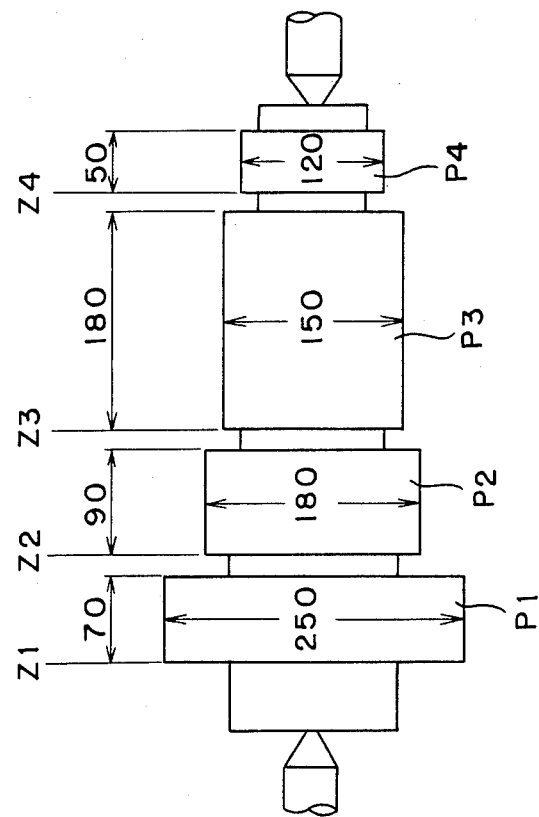
FIG. 2 is an explanatory view of one example of step-shaped cylindrical workpieces machined by the numerically controlled grinding machine.

Referring now to the drawings, wherein like reference numerals designate identical or corresponding parts throughout the several views, and more particularly to FIG. 1 thereof, a grinding machine with a numerical controller according to the present invention is shown having a bed 10, which mounts on an upper-front portion thereof a work table 11 slidable in a Z-axis direction. The work table 11 is movable by a servomotor 12, fixedly mounted on a lateral surface of the bed 10, in the Z-axis direction. The work table 11 mounts thereon a work head 15 and a foot stock 17, which respectively carries a work spindle 14 rotatable by a motor 13 and a foot stock center 16. A work spindle center 18 and a drive pin 19 is fixedly provided on the work spindle 14. A step-shaped cylindrical workpiece W, which as shown in FIG. 2 has at respective axial positions thereon a plurality of portions P1-P4 to be machined, is supported between the work spindle center 18 and the foot stock center 16 and is in engagement with the drive pin 19.

Mounted upon an upper-rear portion of the bed 10 is a wheel head 22, which is slidable in an X-axis direction perpendicular to the axis of the workpiece W. The wheel head 22 carries a grinding wheel 21 rotated by a wheel drive motor 20 and is movable by a servomotor 23 fixed on the rear portion of the bed 10. The servomotors 12 and 23 are respectively connected to drive circuits 25 and 26 to which feed pulses are distributed from a pulse generating circuit 24. When feed pulses are supplied to the drive circuits 25 and 26, each of the wheel head 22 and the work table 11 is displaced an amount corresponding to the number of the supplied feed pulses, whereby relative position between the wheel head 22 and the work table 11 is changed to machine the workpiece W.

The bed 10 further mounts a sizing device 28 thereon at a position facing the grinding wheel 21 through the workpiece W. The sizing device 28 is designed to measure the diameter of each workpiece cylindrical portions being processed and to emit a number of sizing signals respectively when the diameter of the workpiece cylindrical portion reaches predetermined values. The sizing device 28 is movable by a hydraulic cylinder, not shown, to and from a sizing position indicated in FIG. 1. The wheel head 22 mounts on a rear portion thereof a dressing apparatus 27 for dressing the grinding wheel 21.

Reference numeral 31 denotes a data processor constituting a computerized numerical controller 30 along with the above-noted pulse generating circuit 24. The data processor 31 is connected to a memory device 32, a manual data input device (MDI) 33 and a manipulation board 35. The sizing device 28 is also connected to the data processor 31 through an interface, not shown, for applying the sizing signals thereto. The data input device 33 enables an operator to input machining data, including a grinding mode, a grinding width and a finish diameter, with respect to each of the cylindrical portions P1-P4 which are formed on the workpiece W respectively at different axial positions. The machining data input by the data input device 33 are stored in a machining data buffer area MDBA of the memory device 32 under the control of the data processor 31. The following TABLE 1 shows details of the machining data stored in the machining data buffer area MDBA.

TABLE 1

| portion | grinding position | grinding width | grinding mode | finish accuracy | initial dia. | finish dia. |
|---|---|---|---|---|---|---|
| P1 | Z1 | 70 | PID | 2 | 255 | 250 |
| P2 | Z2 | 90 | PD | 1 | 183 | 180 |
| P3 | Z3 | 180 | TID | 2 | 156 | 150 |
| P4 | Z4 | 50 | PID | 3 | 124 | 120 |

As seen from the TABLE 1, the machining data define a grinding axial position, a grinding width, a grinding mode, a finish accuracy, an initial diameter and a finish diameter with regard to each of the cylindrical portions P1-P4 to be ground. In TABLE 1, each grinding position datum indicates an axial distance between a reference surface (e.g., Z1 in FIG. 2) and the left end of each cylindrical portion to be ground, along the axis of the workpiece W. Grinding mode data PID, PD and TID respectively represent an indirect sizing plunge grinding mode, a direct sizing plunge grinding mode and an indirect sizing traverse grinding mode. The finish accuracy for each cylindrical portion is represented by a value of finish grade, wherein a smaller value means a higher finish accuracy.

When a program preparation command switch SW1 on the manipulation board 35 is depressed after the above-noted machining data is input by the data input device 33, the data processor 31 first executes step 40 of a routine shown in FIG. 4(a) to decide the order in which the plurality of workpiece portions P1-P4 are to be machined. As will be described later in detail, the grinding order is decided based upon the machining data for the cylindrical portions P1-P4 shown in TABLE 1 and is registered in a grinding order write-in table MOWT provided in the memory device 32. Upon completion of this processing, step 41 is next reached, wherein there is prepared a numerical control program (hereafter referred to as an "NC program") for use in machining the plurality of cylindrical portions P1-P4 in the decided grinding order. The preparation processing for such an NC program is substantially the same as that executed by a known numerical controller, and the detail thereof is therefore omitted for the sake of brevity. It is however to be noted that various NC data including table indexing positions, rapid feed amounts, rough grinding infeed amounts and fine grinding infeed amounts are calculated based upon the above-noted grinding position data, initial diameter data, finish diameter data and the like and are stored in an NC data area NCDA of the memory device 33.

Figures 3A, 3B:
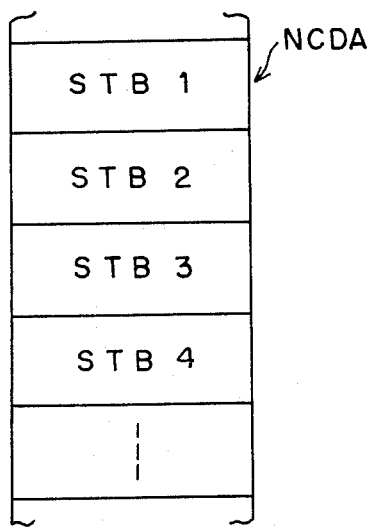
FIG. 3(a) is an explanatory view showing the organization of a storage area NCDA for a numerical control program.
FIG. 3(b) is an explanatory view showing the details of one of data storage areas STB1-STBn allocated in the storage area NCDA, each of which store one segment of the numerical control program.

The preparation processings for the NC program are executed for respective cylindrical portions P1-P4 in the same order as the grinding order determined in step 40. Respective NC program segments prepared for the cylindrical portions P1-P4 are successively written in a plurality of data tables STB1-STB4 which as shown in FIG. 3(a), are provided in the NC data area NCDA of the memory device 32. FIG. 3(b) shows the typical details of one of the NC program segments, which is prepared for the cylindrical portion P2 and which is stored in the data table STB1. Each of these data tables STB1-STB4 stores data indicative of a grinding mode at its first memory address and also stores table indexing position data, rapid feed amount data, rapid feed rate data and so forth respectively at other memory addresses contiguous to the first memory address. In the case of the grinding mode being a traverse grinding mode, a table traverse feed stroke is calculated based upon input data indicative of a grinding width and along with a number of times of traverse feed movements and the like which are also automatically calculated, is stored in appropriate memory addresses of each data table. Various feed rate data such as wheel head infeed rate, table traverse feed rate and the like are chosen from those data which have been stored in a parameter storage area, not shown, in advance and are respectively stored in other appropriate memory addresses of each data table.

Figure 5:
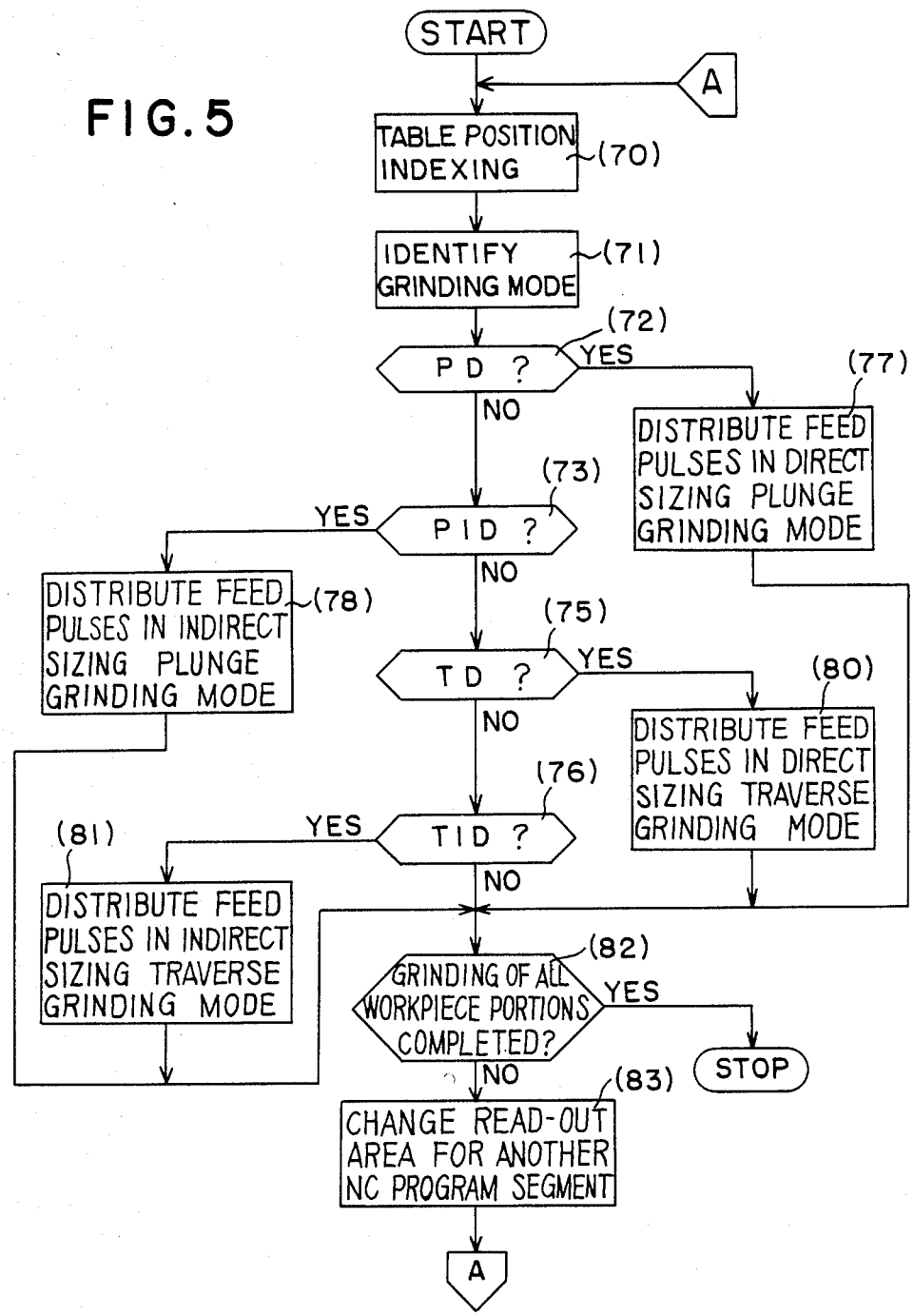
FIG. 5 is a specific flow chart of numerical control execution routine executed by the data processor for actually controlling the grinding machine in accordance with the prepared numerical control program.

The preparation of the NC program is completed in the foregoing manner. With a machining start command switch SW2 then depressed by an operator, the data processor 31 executes an NC execution routine shown in FIG. 5, whereby the cylindrical portions P1-P4 are ground in the decided grinding order and whereby each of the cylindrical portions P1-P4 is ground in a grinding mode designated thereto and in accordance with an NC program segment including various control data prepared therefor.

More specifically, reference is first made to the NC program segment being stored in the first data table STB1 of the NC data area NCDA, and table indexing position data are read out in step 70 to effect pulse distribution to index the work table 11 to a position designated by the read-out position data. Subsequently, the kind of a grinding mode designated is identified through the execution of steps 71-76, and in one of steps 77, 78, 80 and 81, pulse distribution is carried out in the identified grinding mode, so that one of the cylindrical portions P1-P4 is ground.

Figure 6A:
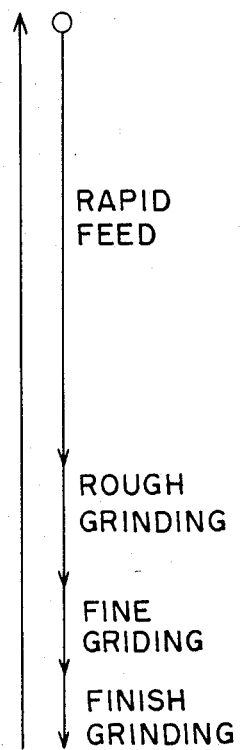
FIG. 6(a) is an operational cycle chart showing the movement of a grinding wheel head in a plunge grinding mode.
Figure 6B:
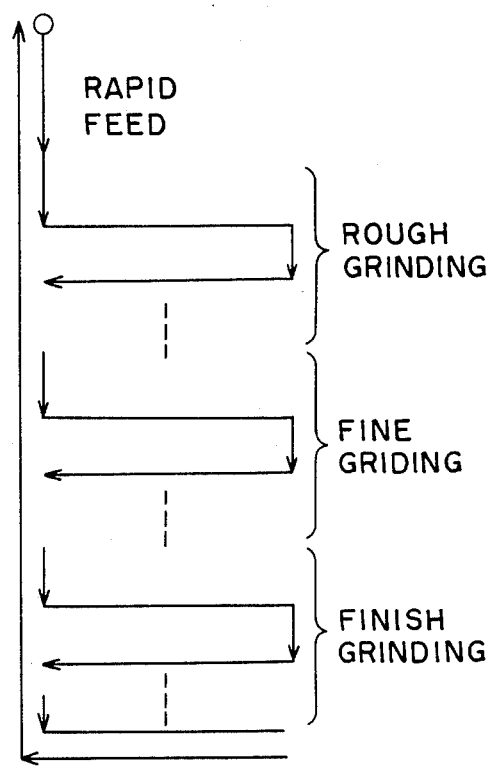
FIG. 6(b) is another operational cycle chart showing the relative movement between the wheel head and a workpiece support table in a traverse grinding mode.

FIGS. 6(a) and 6(b) show grinding cycle charts indicating relative feed movements between the work table 11 and the wheel head 22 in a plunge grinding mode and a traverse grinding mode, respectively. In the case where each of the plunge grinding mode and the traverse grinding mode needs the direction control by the sizing device 28, the pulse distribution in each of a rough grinding step, a fine grinding step and a final grinding step is discontinued in response to the corresponding one of the sizing signals from the sizing device 28. On the other hand, in the case where each of the plunge grinding mode and the traverse grinding mode does not need the direction control by the sizing device 28, the pulse distribution in each grinding step is discontinued when the feed amount in each grinding step coincides with an amount calculated and designated. The repetition of the above-described operations results in grinding the plurality of cylindrical portions P1-P4 in the decided grinding order.

The procedural steps of deciding the grinding order will now be described with reference to flow charts shown in FIGS. 4(b) and 4(c). The data processor 31 first initializes the grinding mode write-in table MOWT of the memory device 32 in step 50 of FIG. 4(b) and then, sets "1" in an order counter, not shown, in step 51. Step 52 is next reached, wherein the data processor 31 executes processings for selecting one of the cylindrical portions P1-P4 which is to be first machined. As shown by a flow chart in FIG. 4(c), such selection is so that one or more portions to be machined under the direct control of the sizing device 28 are preferentially machined, successive to which one or more other portions to be machined in a traverse grinding mode are next machined, and that the remaining portions to be machined in a plunge grinding mode are finally machined in an order of one having the widest width to another having the narrowest width.

Accordingly, there is first selected in step 60 a portion which should be machined under the direction control of the sizing device 28 to have a high finish accuracy and to become thereby a reference for the machinings of other portions. If two or more portions of the workpiece W require the direction control by the sizing device 28, the routine of the data processor 31 is advanced from step 60 to the right in FIG. 4(c), whereby there is first selected a portion needing the highest machining accuracy, from those which are to be machined under the direction control of the sizing device 28. If this does not yet permit a particular one to be selected out of those portions, the criterion for selection is in turn changed for one which is to be machined in a traverse grinding mode and further, for one which has the widest width of all. Furthermore, if the above-noted criterions still do not permit a particular one to be selected out of those portions, a portion nearest to one which has been specified in a latest or preceding selection operation is finally selected.

When the portion on the workpiece W which is to be first machined is determined in this manner, the routine of the data processor 31 is moved from one of steps 60 and 60a–60d to step 53 of FIG. 4(b). In this step 53, the counted value "1" of the order counter OC is written in a memory address which is one of a plurality of memory addresses reserved in the grinding order write-in table MOWT and which is allocated to the selected workpiece portion, namely, to the portion P2 in this particular instance, as shown in the following TABLE 2.

TABLE 2

| Portion to be ground | storage address | grinding order |
| --- | --- | --- |
| P1 | Dm | 3 |
| P2 | Dm + 1 | 1 |
| P3 | Dm + 2 | 2 |
| P4 | Dm + 3 | 4 |

Upon completion of this processing, step 55 is next executed to increment the content of the grinding order counter DC and it is ascertained in step 56 whether or not the machining order has been determined with respect to all of the workpiece portions P1–P4 to be machined. If the machining order like in this described case, has not yet been determined with respect to all of the workpiece portions P1–P4, return is then made from step 56 to step 52, whereby the foregoing processings are repeated for deciding the machining order with respect to the remaining workpiece portions to be machined.

Figure 4C:
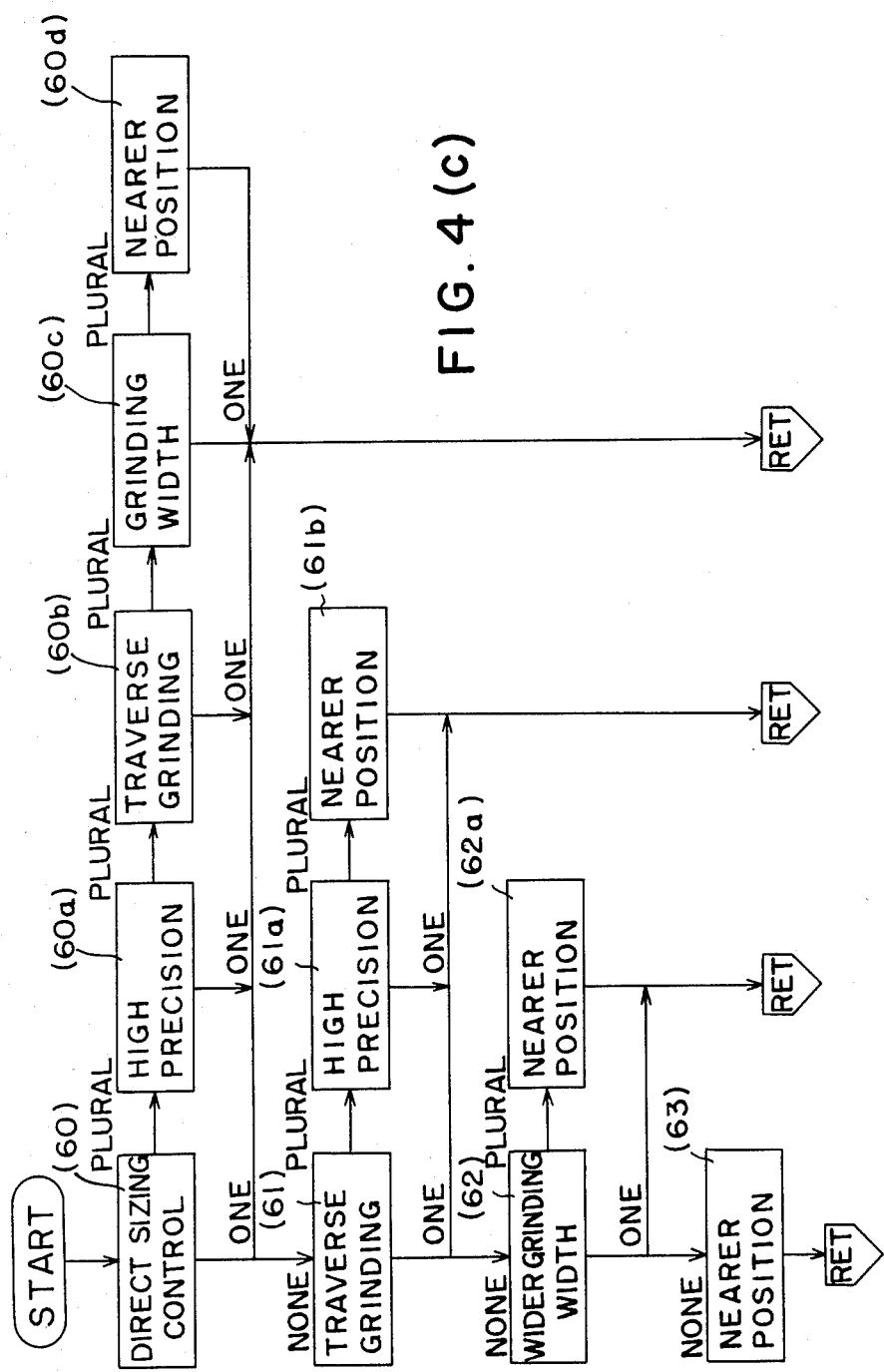
FIG. 4(c) is a specific flow chart of a workpiece portion selection routine executed by the data processor in step 52 of FIG. 4(b)

Consequently, another workpiece portion is selected in accordance with the procedural step embodied in FIG. 4(c). Because the workpiece portion P2 to be machined under the control of the sizing device 28 has already been given a grinding order number "1" and because none of the remaining workpiece portions P1, P3 and P4 is scheduled to be machined under the control of the sizing device 28, the routine of the data processor 31 is moved from step 60 to step 61 so as to select thereby another workpiece portion P3 which is to be ground in a traverse grinding mode. Step 53 of FIG. 4(b) is next reached, wherein the presently counted value "2" of the grinding order counter OC is written in a memory address of the grinding order write-in table MOWT allocated to the workpiece portion P3, and the counted value of the order counter OC is then incremented in step 55. As no grinding order has been decided yet for the workpiece portions P1 and P4, the data processor 31 returns its routine from step 56 to step 52 to execute the foregoing processings again.

Each of the workpiece portions P1 and P4 needing a plunge grinding operation, the processing by the data processor 31 in the grinding order decision routine shown in FIG. 4(c) is directed from step 61 to 62, thereby selecting the workpiece portions P1 with a wider width so that in step 53, the counted value "3" of the order counter OC is written in a memory address of the grinding order write-in stable MOWT allocated to the selected portion P1. Subsequently, steps 55 and 56 are followed to return to step 52, wherein the foregoing processings are executed again with the result of writing the counted value "4" of the order counter OC in another address of the grinding order write-in table MOWT allocated to the workpiece portion P4, thereby completing the processings for decision of grinding order.

The grinding order deciding routine shown in FIG. 4(c) is arranged such that if the workpiece W has a number of portions each needing a traverse grinding, a portion with a higher required accuracy has preference to another portion nearer to one which has already been specified in a preceding selection operation. The routine is further arranged such that if the workpiece W has a number of workpiece portions each needing a plunge grinding operation under the indirect sizing control and having the same width as each other, selection is carried out for one of the workpiece portions nearest to another which has already been specified in a preceding selection operation.

When the grinding order of the workpiece portions P1–P4 is decided in the foregoing manner, the NC program for the workpiece W is automatically prepared based upon the machining data and the decided grinding order and is stored in the NC data area NCDA, as described earlier. With the machining start command SW2 given thereafter, the NC program segments for the respective workpiece portions P1–P4 are successively read out in such an order as they were stored, and the workpiece portions P1–P4 are successively ground in accordance with the NC program segments. As a result, the workpiece portions P1–P4 are consecutively machined in the grinding order which has been decided pursuant to the above-described selection process. This advantageously makes it possible to grind precisely the plurality of portions P1–P4 on the workpiece W without performing a dressing operation in the course of machining all portions P1–P4 of the workpiece W.

Obviously, numerous modifications and variations are possible in light of the above teachings. It is therefore to be understood that within the scope of the appended claims, the present invention may be practiced otherwise than as specifically described herein.

What is claimed as new and desired to be secured by Letters Patent of the United States is:

1. A numerical controller for a grinding machine having a bed, a workpiece support mounted on said bed for rotatably carrying a workpiece provided with a plurality of portions to be ground respectively at different axial positions thereon, a wheel support mounted on said bed for rotatably carrying a grinding wheel, first feed means for effecting relative movement between said workpiece support and said wheel support so as to present selectively said workpiece portions before said grinding wheel, and second feed means for effecting relative movement between said workpiece support and said wheel support so as to move said grinding wheel toward and away from said workpiece, said numerical controller comprising:

data input means for inputting plural grinding modes in which said workpiece portions are to be ground and plural sets of machining data respectively used for grinding said workpiece portions;

memory means for storing said plural grinding modes and said plural sets of machining data input by said data input means;

grinding order decision means responsive to said plural grinding modes and said plural sets of machining data stored in said memory means for deciding a grinding order in which said workpiece portions are ground, in accordance with a predetermined rule; and numerical control means responsive to said grinding order decided by said grinding order decision means and said plural sets of machining data stored in said memory means for controlling said first and second feed means to grind said workpiece portions in said decided grinding order and based upon said plural sets of machining data.

2. A numerical controller as set forth in claim 1, wherein:

said predetermined rule upon which said grinding order decision means relies to decide said grinding order is provided for decreasing the number of dressing operations effected on said grinding wheel.

3. A numerical controller as set forth in claim 2, wherein said various grinding modes includes a direct sizing grinding mode, a traverse grinding mode and a plunge grinding mode, and wherein:

said grinding order decision means include means for deciding said grinding order in accordance with said predetermined rule so that said direct sizing grinding mode has preference to said traverse grinding mode which in turn has preference to said plunge grinding mode.

4. A numerical controller as set forth in claim 3, wherein said plural sets of machining data include respective axial widths of said workpiece portions, and wherein:

said grinding order decision means include means for deciding said grinding order in accordance with said predetermined rule so that if said plunge grinding mode is designated for each of at least two of said workpiece portions, one of said at least two workpiece portions having a wider axial width has preference to the remainder of said at least two workpiece portions.

5. A numerical controller as set forth in claim 2, wherein said numerical control means includes:

automatic programming means responsive to said plural sets of machining data stored in said memory means and said grinding order decided by said grinding order decision means for automatically preparing a numerical control program which enables saids workpiece portions to be ground successively to respective dimensions designated by said plural sets of machining data in said decided grinding order, and for storing said numerical control program in said memory means; and feed control means connected to said first and second feed means and responsive to said numerical control program stored in said memory means for controlling said first and second feed means to grind said workpiece portions in accordance with said numerical control program.

6. A numerical controller for a grinding machine having a bed, a workpiece support mounted on said bed for rotatably carrying a workpiece provided with a plurality of portions to be ground respectively at different axial positions thereon, a wheel support mounted on said bed for rotatably carrying a grinding wheel, first feed means for effecting relative movement between said workpiece support and said wheel support so as selectively to present said workpiece portions before said grinding wheel, and second feed means for effecting relative movement between said workpiece support and said wheel support so as to move said grinding wheel toward and away from said workpiece, said numerical controller comprising:

data input means for inputting plural grinding modes in which said workpiece portions are to be ground and plural sets of machining data respectively used for grinding said workpiece portions;

memory means for storing said plural grinding modes and said plural sets of machining data input by said data input means;

pulse generating circuit means connected to said first and second feed means for applying feed pulses so as to control relative movement between said workpiece support and said wheel support; and a data processor connected to said memory means and said pulse generating circuit means and capable of performing;

a grinding order decision function responsive to said various grinding modes and said plural sets of machining data stored in said memory means for deciding a grinding order in which said workpiece portions are ground, in accordance with a predetermined rule provided for decreasing the number of dressing operations performed on said grinding wheel;

an automatic programming function responsive to said plural sets of machining data stored in said memory means and said grinding order decided by the execution of said grinding order decision function for automatically preparing a numerical program which enables said workpiece portions to be ground successively to respective dimensions designated by said plural sets of machining data in said decided grinding order, and for storing said numerical control program in said memory means; and a feed control function responsive to said numerical control program prepared by the executing of said automatic programming function for controlling said pulse generating circuit means to grind successively said workpiece portions in accordance with said numerical control program.

7. A numerical controller as set forth in claim 6, wherein said plural grinding modes include a direct sizing grinding mode, a traverse grinding mode and a plunge grinding mode, and wherein:

said data processor, when executing said grinding order decision function, includes means for deciding said grinding order in accordance with said predetermined rule so that said direct sizing grinding mode has preference to said traverse grinding mode which in turn has preference to said plunge grinding mode.

8. A numerical controller as set forth in claim 7, wherein said plural sets of machining data include respective axial widths of said workpiece portions, and wherein:

said data processor, when executing said grinding order decision function, includes means for deciding said grinding order in accordance with said predetermined rule so that if said plunge grinding mode is designated for each of at least two of said workpiece portions, one of said at least two workpiece portions having a wider axial width has preference to the remainder of said at least two workpiece portions.

* * * * *